(12) United States Patent
Danmayr et al.

(10) Patent No.: US 9,800,174 B2
(45) Date of Patent: Oct. 24, 2017

(54) POWER SUPPLY FOR AN INVERTER AND METHOD FOR OPERATING POWER SUPPLY FOR AN INVERTER

(71) Applicant: FRONIUS INTERNATIONAL GmbH, Pettenbach (AT)

(72) Inventors: Joachim Danmayr, Nussbach (AT); Stefan Bloechl, Schofweg (DE); Andreas Luger, Weisskirchen (AT); Dietmar Striegl, Bad Hall (AT); Martin Moertenhuber, Sattledt (AT)

(73) Assignee: FRONIUS INTERNATIONAL GmbH, Pettenbach (AT)

( * ) Notice: Subject to any disclaimer, the term of this patent is extended or adjusted under 35 U.S.C. 154(b) by 0 days.

(21) Appl. No.: 14/403,867

(22) PCT Filed: May 24, 2013

(86) PCT No.: PCT/EP2013/060731
§ 371 (c)(1),
(2) Date: Nov. 25, 2014

(87) PCT Pub. No.: WO2013/178546
PCT Pub. Date: Dec. 5, 2013

(65) Prior Publication Data
US 2015/0146463 A1    May 28, 2015

(30) Foreign Application Priority Data
Jun. 1, 2012    (AT) ............................... A 50216/2012

(51) Int. Cl.
*H02P 27/00* (2006.01)
*H02M 7/46* (2006.01)
(Continued)

(52) U.S. Cl.
CPC ................ *H02M 7/46* (2013.01); *H02J 3/38* (2013.01); *H02J 9/062* (2013.01); *H02M 7/48* (2013.01); *H02M 2001/0006* (2013.01)

(58) Field of Classification Search
CPC ... H02M 7/48; H02M 2001/0006; H02M 7/46
(Continued)

(56) References Cited

U.S. PATENT DOCUMENTS 8,536,803 B2 *   9/2013   Sadwick ............ H05B 41/2824
                                                     315/209 R
2002/0145895 A1 * 10/2002  Liu .......................... H02J 1/102
                                                     363/65
(Continued)

FOREIGN PATENT DOCUMENTS

CN        101969201        2/2011
CN        102299524        12/2011
(Continued)

OTHER PUBLICATIONS

China Office Action conducted in China Appln. No. 201380028217.7 (dated Jun. 20, 2016) (w/ English language translation).

*Primary Examiner* — Adolf Berhane
*Assistant Examiner* — Afework Demisse
(74) *Attorney, Agent, or Firm* — Greenblum & Bernstein, P.L.C.

(57) ABSTRACT

Power supply for an inverter and method for operating power supply. Power supply includes a throttle arranged to connect an output end of the inverter to an electric power supply network; a secondary-side auxiliary winding that is arranged on the throttle to transmit an output voltage (UA) of the inverter to a secondary side of the throttle; and a comparator unit. The comparator unit compares a voltage (U1) of the electric supply network with the voltage (U2) of the secondary side of the throttle, to supply, depending upon (Continued)

a result of the comparison of the electric supply network voltage (U1) to the secondary side voltage (U2) of the throttle, electric power to the power supply either from the electric supply network or via the secondary-side auxiliary winding.

9 Claims, 2 Drawing Sheets

(51) Int. Cl.
| | | |
|---|---|---|
| *H02M 7/48* | (2007.01) | |
| *H02J 9/06* | (2006.01) | |
| *H02J 3/38* | (2006.01) | |
| *H02M 1/00* | (2006.01) | |

(58) Field of Classification Search
USPC .. 307/32, 33, 37, 47, 64, 66, 80, 82, 85–87, 307/130; 363/21.15, 21.12, 34, 97, 98, 363/131, 132; 323/205, 207; 318/800–805, 400.3
See application file for complete search history.

(56) References Cited

U.S. PATENT DOCUMENTS

| | | | | |
|---|---|---|---|---|
| 2008/0094860 | A1* | 4/2008 | Falk | H02M 3/3372 |
| | | | | 363/17 |
| 2008/0316774 | A1* | 12/2008 | Ito | B60K 6/48 |
| | | | | 363/17 |
| 2009/0302691 | A1* | 12/2009 | Wang et al. | 307/129 |
| 2011/0074356 | A1* | 3/2011 | Yamazaki | H02J 7/0052 |
| | | | | 320/134 |

FOREIGN PATENT DOCUMENTS

| | | | |
|---|---|---|---|
| CN | 102427236 | | 4/2012 |
| DE | 10 2008 032 317 | | 12/2009 |
| JP | 09149659 A | * | 6/1997 |
| JP | H09-149659 | | 6/1997 |
| JP | 2003-180085 | | 6/2003 |
| JP | 2003180085 A | * | 6/2003 |
| JP | 2006-238610 | | 9/2006 |
| JP | 2009-017647 | | 1/2009 |

* cited by examiner

POWER SUPPLY FOR AN INVERTER AND METHOD FOR OPERATING POWER SUPPLY FOR AN INVERTER

CROSS-REFERENCE TO RELATED APPLICATIONS

The present application U.S. National Stage of International Patent Application No. PCT/EP2013/060731 filed May 24, 2013, and claims priority under 35 U.S.C. §§119 and 365 of Austrian Patent Application No. A50216/2012 filed Jun. 1, 2012. Moreover, the disclosure of International Patent Application No. PCT/EP2013/060731 is expressly incorporated by reference herein in its entirety.

BACKGROUND OF THE INVENTION

1. Field of the Invention

The present invention relates to a power supply for an inverter, which is connected at the output end to an electric power supply network via a throttle. The present invention also relates to a method for operating such a power supply.

2. Discussion of Background Information

Electric inverters require a power supply for operation, for generating a supply voltage for the regulating and control units of the inverter as well as the electronic components installed in the inverter. This supply voltage is often made available by a switched-mode power supply which may also be integrated into the inverter. Such inverters are also used for, among other things, connecting an energy source, for example, a photovoltaic system, a wind power plant, an electric power storage mechanism, a fuel cell, etc., to an electric supply network in order to feed generated electric power into the supply network. At the output end of the supply network, such inverters often have filter units such as a throttle, for example. The switched-mode power supply acquires the electric power needed for operation from the electric supply network, in particular to then be able to operate and/or service the inverter, in particular when the electric power storage mechanism cannot supply any electric power, for example, at night in the case of a photovoltaic system or in the absence of wind in the case of a wind power plant. Conversely, in the event of a failure of the electric supply network due to a short circuit in the supply network, for example, the switched-mode power supply and thus also the inverter would also fail. The electric power source could then no longer supply electric power to the supply network. However, various standards stipulate that an inverter must remain in operation for a certain period of time in the event of a failure of the electric power system in order to be able to support the power supply network by supplying the active power on demand. Therefore, measures are necessary so that, even when the electric supply network fails, it is possible to continue operation of the inverter, which is operated by a switched-mode power supply that receives its power supply from the electric supply network.

Capacitors are frequently used for this purpose in the switched-mode power supply in order to buffer the voltage supply for the required period of time. The disadvantage of this approach is that such a capacitor buffer can be designed only for a certain precisely defined period of time and also requires an enormous amount of space in the inverter and/or in the switched-mode power supply because of the large capacitors required. Furthermore, the expensive capacitors and other electric components also necessitate high costs.

As a possible alternative, it is also known that a second power supply network part, which obtains its energy from the electric power storage mechanism in the event of a system failure, can be provided in the switched-mode power supply. However, this approach is also associated with a substantial requirement for space and high costs in order to be implementable. Such a power supply is known from DE 10 2008 032 317 A1, for example. The power supply of DE 10 2008 032 317 A1 has a transformer with two primary windings of two primary circuits, where a first primary circuit receives power from the intermediate circuit of the converter and the second primary circuit receives power from the power supply network, switching back and forth between the two primary circuits, depending on the voltage applied in the second primary circuit. Each primary circuit comprises a PWM switch with the respective PWM controller.

SUMMARY OF THE EMBODIMENTS

Embodiments of the present invention are directed to eliminate the disadvantages of the known solutions mentioned above.

According to embodiments of the invention, an auxiliary winding on the secondary end provided on the output-end throttle transmits the output voltage of the inverter to the secondary end of the throttle and a comparator unit provided in the power supply, compares the voltage of the electric supply network with the voltage of the secondary end of the throttle and, depending on the result of the comparison, supplies electric power to the power supply from either the electric supply network or via the secondary-end auxiliary winding. The power supply thus receives the required electric power either from the electric supply network or directly from the output of the inverter. To do so, an auxiliary winding is provided on the throttle and a comparator unit is inserted, while all the other parts of the power supply may remain the same. This configuration also regulates itself automatically, based on the voltage level, and ensures an uninterrupted power supply. Therefore, it is not necessary to provide large expensive capacitors, nor is it necessary to provide two switched-mode power supplies. Quite the contrary, the power supply according to the invention can be installed very easily and inexpensively.

A power supply of a particularly simple design can be implemented if an input rectifier and an auxiliary winding rectifier are provided at the input end of the power supply, such that the power supply network is connected to the input of the input rectifier, and the voltage of the secondary side of the throttle is applied to the input of the auxiliary winding rectifier, and the output terminals of the input rectifier and the auxiliary winding rectifier are connected in parallel.

A particularly simple design is obtained when bridge rectifiers are used as the input rectifier and/or as the auxiliary winding rectifier.

It is also advantageous to provide a DC-DC converter in the power supply such that its input is connected to the output terminals of the input rectifier and of the auxiliary winding rectifier.

BRIEF DESCRIPTION OF THE DRAWINGS

The present invention is explained in greater detail below with reference to FIGS. 1 and 2, which illustrate advantageous embodiments of the invention schematically and in a nonrestrictive manner. They show.

DETAILED DESCRIPTION OF THE EMBODIMENTS

Figure 1:
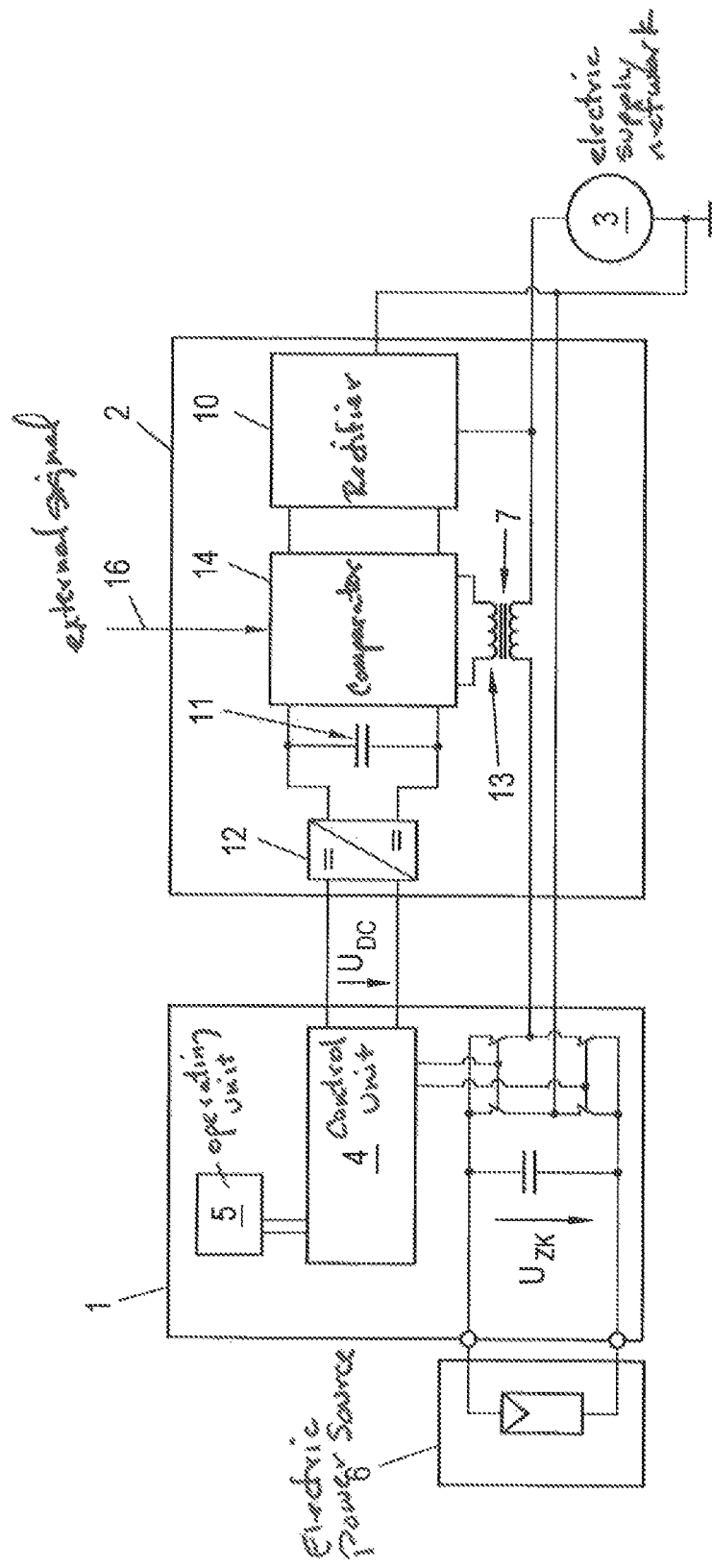
FIG. 1 is an electric schematic diagram of a power supply according to the invention.

FIG. 1 shows an inverter 1 of a power supply 2, which is supplied with electric power, such that the power supply 2 is connected to an electric supply network 3, such as a 230V alternating voltage network. The DC output of the power supply 2 makes available the power supply voltage $U_{DC}$ of the inverter 1 and/or of the regulating and control unit 4 as well as an operating unit 5 of the inverter 1. In the exemplary embodiment illustrated here, the inverter 1 connects an electric power source 6, such as a solar cell in this example, to the electric supply network 3. An inverter 1 is essentially well known, which is why the design and the function of the inverter 1 will not be discussed in greater detail here. As is already known, a throttle 7 is provided as a filter unit at the output end. In the present exemplary embodiment, the throttle 7 may also be integrated into the power supply 2, in particular when the power supply 2 and the inverter 1 are designed as matching components that belong together.

The power supply 2, for example, in the form of a switched-mode power supply, has a rectifier 10 here at the input end, for example, a bridge rectifier, a smoother capacitor 11 and at the output end has a DC-DC converter 12 for generating the power supply voltage $U_{DC}$. Smoothing capacitor 11 may also be part of the DC-DC converter 12, for example, in the form of an intermediate circuit capacitance in the DC-DC converter 12 or it may also be omitted entirely.

According to the invention, the power supply 2 is now supplemented by an auxiliary winding 13 on the throttle 7 and a comparator unit 14. The auxiliary winding 13 forms the secondary side of the throttle 7. The auxiliary winding 13 may additionally be applied, for example, to the iron core of the throttle 7. In the case of a multiphase inverter, it is sufficient to supplement only one throttle 7 of a single phase accordingly. The comparator unit 14 may be embodied as an active comparator unit, for example, in the form of a comparator, or as a passive comparator unit, for example, bridge rectifier as in FIG. 2. Through the additional auxiliary winding 13, the throttle 7 then also has a transformer function, as described in detail further below, and the auxiliary winding 13 transmits the output voltage $U_A$ of the inverter 1 to the secondary side of the throttle 7.

Figure 2:
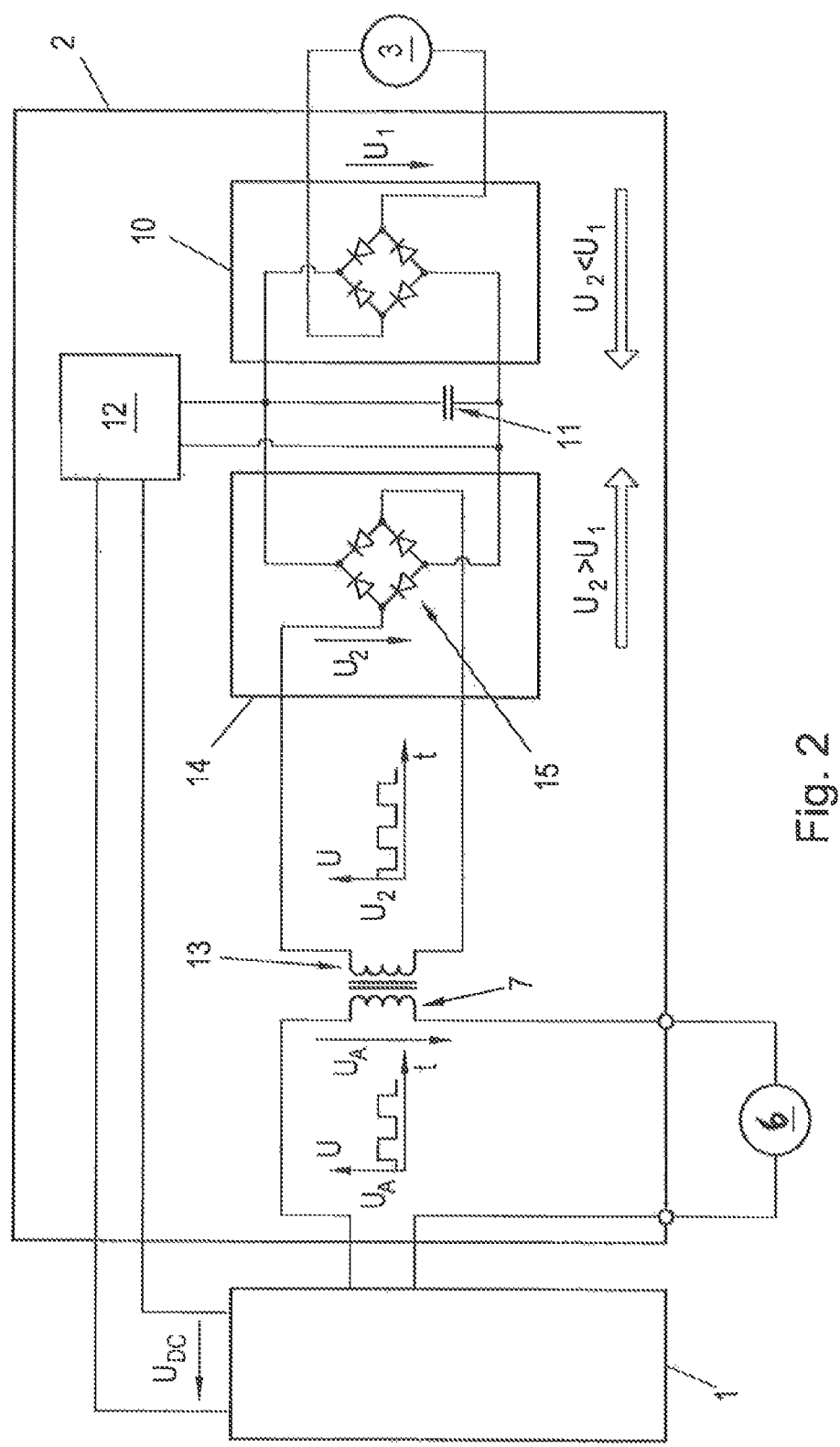
FIG. 2 is a design of the power supply using bridge rectifiers.

Reference is made to FIG. 2 for the description of the function of the power supply 2 according to the invention. The comparator unit 14 here is embodied passively in the form of an auxiliary winding rectifier 15, specifically a bridge rectifier. At the input end of the power supply 2, the voltage $U_1$ of the electric supply network 3 is applied, and is also rectified in the input rectifier 10, which is also a bridge rectifier here, and is smoothed by the smoothing capacitor 11. A voltage $U_2$ from the output voltage $U_A$ of the inverter 1 is induced on the secondary side of the throttle 7 formed by the auxiliary winding 13, and is rectified in the auxiliary winding rectifier 15. To do so the voltage $U_2$ of the secondary side of the throttle 7 is switched to the input terminal of the auxiliary winding rectifier 15. The input rectifier 10 and the auxiliary winding rectifier 15 are connected in parallel, i.e., the output terminals of the rectifiers 10, 15 are each connected to one another. The output terminals of the rectifiers 10, 15 which are connected in parallel are connected to the input terminals of the DC-DC converter 12.

As long as the input voltage $U_1$ is greater than the voltage $U_2$ on the secondary side of the throttle 7, the power supply 2 is consequently supplied by the supply network 3. In other words the input rectifier 10 is active. Accordingly the auxiliary winding rectifier 15 is deactivated because the diodes are blocking because of the lower voltage $U_2$. If the voltage $U_1$ in the supply network 3 drops in the case of a system collapse or a system failure, for example, then it holds that $U_2 > U_1$, so the power supply 2 obtains electric power via the secondary side of the throttle 7, i.e., via the auxiliary winding 13 and thus obtains electric power directly from the output voltage $U_A$ of the inverter 1. Accordingly, the input rectifier 10 is deactivated because of the lower voltage $U_1$ and the blocking diodes while the auxiliary winding rectifier 15 is activated. Due to the additional auxiliary winding rectifier 15, thus a comparison of the voltages $U_1$ and $U_2$ is performed and the energy flow into the power supply 2 is controlled (indicated in FIG. 2 by the two arrows in the direction of the smoothing capacitor 11). The energy flow is self-regulating here because of the voltage level of the voltages $U_1$ and $U_2$. Thus the rectifier 10, 15 having the higher input voltage will make available more current for the DC-DC converter 12 and/or the capacitor 11, so that the latter is active accordingly. If the voltages $U_1$ and $U_2$ approximate one another because of the declining voltage $U_1$, then both rectifiers 10, 15 are also activate activated briefly in the switching phase. Accordingly, if the voltage $U_2$ is larger than the voltage $U_1$ to a sufficient extent (determined essentially by the lock voltage of the diodes), then only the auxiliary winding rectifier 15 is active. Activation of the auxiliary winding rectifier 15 thus occurs without interruption.

The voltage $U_2$ may be determined on the secondary side of the throttle 7 by the transmission ratio of the primary winding of the throttle 7 to the additional auxiliary winding 13. The transmission ratio can be dimensioned through corresponding adjustment of the winding number of the auxiliary winding 13 in relation to the winding number of the primary winding, as a function of the height of the intermediate circuit voltage $U_{ZK}$ in the inverter 1 and the desired voltage $U_2$. In the case of a single-phase power supply 2 with voltage rating of 230V AC and an intermediate circuit voltage range around 400V, the transmission ratio to be selected would be in the range of 1:1, for example. To prevent voltage peaks, an additional suppressor circuit may also be provided on the secondary side of the throttle 7. In addition, the direction of energy flow for the power supply of power supply 2 can be determined through corresponding dimensioning of the transmission ratio and a suppressor circuit that may optionally be present. Thus, with appropriate dimensioning, the energy flow can be controlled, so that the power for the power supply 2 is obtained via the auxiliary winding 13 only in the event of a system failure, and thus the supply of the inverter 1 is provided only then. Thus, a definition and/or decision about which rectifier 10, 15 will supply the power supply 2 is/are made with the transmission ratio and the resulting voltage $U_2$. Thus reliable operation of the inverter 1 is ensured in any case.

If the voltage $U_1$ and $U_2$ are equal, the energy flow is divided uniformly in the case of passive control of the direction of energy flow. In active control of the direction of energy flow (for example, via an active comparator unit 14), the energy can be obtained in any way, depending on the application case, either from the supply network 3 or from the inverter 1.

Instead of a passive comparator unit 14 as described above, an active comparator unit could also be provided. For example, a comparator, a logic module, a microprocessor, a memory-programmable circuit, etc. may be provided to compare the two voltages $U_1$ and $U_2$ or their rectified values and to supply electric power to the power supply 2 as a function of the result of the comparison either via the power supply network 2 or via the auxiliary winding 13.

The direction of energy flow can also be controlled strategically when using an active comparator unit 14 and need not depend only on the result of the comparison of the two voltages $U_1$, $U_2$. For example, it would also be possible to make the switching depend on an external signal 16 as indicated in FIG. 1, for example, or on other criteria. In other words, for example, the auxiliary winding rectifier 15 is activated as a preventive measure when the inverter 1 and/or the power supply 2 continuously receives information about an imminent system shutdown as an external signal 16 or if the line voltage is dropping continuously. Likewise, the approach according to the invention may also be used for optimization of in-kind consumption of the energy source 6, such as a PV system, for example, in that the components of the energy source 6, in particular of the inverter 1, are supplied with power from the self-produced power.

It is of course also possible to use the inverter 1 with the power supply 2 according to the invention in isolated operation. In this case, an electric power storage mechanism is used for the primary power supply to the power supply 2 as an electric power supply network 3.

The invention claimed is:

1. A power supply for an inverter comprising:
   a throttle, comprising a primary winding, arranged as a filter to connect an output end of the inverter to an electric power supply network, wherein an output voltage (UA) of the inverter is applied to the throttle;
   a secondary-side auxiliary winding that is arranged on the throttle to form a secondary side of the throttle in which a voltage (U2) is induced from the output voltage (UA) of the inverter; and
   a comparator unit, which compares a voltage (U1) of the electric supply network with the voltage (U2) of the secondary side of the throttle, to supply, depending upon a result of the comparison of the electric supply network voltage (U1) to the secondary side voltage (U2) of the throttle, electric power to the power supply either from the electric supply network or via the secondary-side auxiliary winding.

2. The power supply according to claim 1, further comprising: an input rectifier and an auxiliary winding rectifier, wherein the electric supply network is connected to an input of the input rectifier, the voltage (U2) of the secondary side of the throttle is applied to an input of the auxiliary winding rectifier, and output terminals of the input rectifier and of the auxiliary winding rectifier are connected in parallel.

3. The power supply according to claim 2, wherein at least one of the input rectifier and the auxiliary winding rectifier is a bridge rectifier.

4. The power supply according to claim 2, further comprising: a DC-DC converter having an input connected to the output terminals of the input rectifier and of the auxiliary winding rectifier.

5. The power supply according to claim 1, further comprising: an input for an external signal is provided in the comparator unit, and an external signal is taken into account in the comparison.

6. A method for operating the power supply according to independent claim 1, the method comprising:
   comparing the voltage (U1) of the electric supply network with the secondary side voltage (U2) of the throttle; and
   depending upon a result of the comparison of the electric supply network voltage (U1) to the secondary side voltage (U2) of the throttle, supplying electric power to the power supply either from the electric supply network or via the auxiliary winding.

7. The method according to claim 6, further comprising: supplying an external signal and considering the external signal in comparing the electric supply network voltage (U1) to the secondary side voltage (U2) of the throttle.

8. A method for operating a power supply for an inverter, in which a throttle, comprising a primary winding that is arranged as a filter and connects an output end of the inverter to an electric supply network and an auxiliary winding is arranged on the throttle to form a secondary side of the throttle, the method comprising:
   applying an output voltage of the inverter to the throttle, whereby a voltage (U2) is induced in the auxiliary winding;
   comparing a voltage (U1) of the electric supply network with the voltage (U2) of the auxiliary winding, and
   depending upon a result of the comparison of the electric supply network voltage (U1) to the voltage (U2) on the auxiliary winding, supplying electric power to the power supply either from the electric supply network or via the auxiliary winding.

9. The method according to claim 8, further comprising: supplying an external signal and considering the external signal in comparing the electric supply network voltage (U1) to the voltage (U2) on the auxiliary winding.

* * * * *